US009544246B2

(12) United States Patent
Huguies et al.

(10) Patent No.: US 9,544,246 B2
(45) Date of Patent: Jan. 10, 2017

(54) METHOD FOR RESTORING A SERVICE BOOKING SYSTEM IN A NETWORK AFTER FAILURE

(75) Inventors: Bertrand Huguies, Nantes (FR); Gael Mace, Langan (FR); Serge Defrance, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 245 days.

(21) Appl. No.: 12/312,350

(22) PCT Filed: Nov. 8, 2007

(86) PCT No.: PCT/FR2007/052314
§ 371 (c)(1),
(2), (4) Date: May 6, 2009

(87) PCT Pub. No.: WO2008/056088
PCT Pub. Date: May 15, 2008

(65) Prior Publication Data
US 2009/0303870 A1     Dec. 10, 2009

(30) Foreign Application Priority Data
Nov. 10, 2006   (FR) ...................................... 06 54843

(51) Int. Cl.
*G01R 31/08*   (2006.01)
*H04L 12/913*  (2013.01)
(Continued)

(52) U.S. Cl.
CPC ......... *H04L 47/724* (2013.01); *H04L 12/5695* (2013.01); *H04L 41/0668* (2013.01);
(Continued)

(58) Field of Classification Search
CPC .......... H04L 45/28; H04L 45/22; H04L 45/00; H04L 1/22; H04L 12/5695; H04L 41/0668; H04L 41/08; H04L 45/50; H04L 47/15; H04L 41/12; H04L 47/746; H04L 47/781; H04L 41/0695; H04L 41/0896; H04L 47/724; H04J 3/14
(Continued)

(56) References Cited

U.S. PATENT DOCUMENTS 6,941,380 B2     9/2005  Cunningham
7,471,629 B2 *  12/2008  Melpignano .................. 370/232
(Continued)

FOREIGN PATENT DOCUMENTS

EP      1594241 A1     11/2005
JP      2001358719     12/2001
(Continued)

OTHER PUBLICATIONS

Chi-Hsiang Yeh "Scalable, adaptive, and reliable resource management in high-speed and mobile networks" Computer Communication and Networks, 2001. Processings. Thenth International Conference on Oct. 15-17, 2001, Piscatway, NJ, USA, IEEE, Oct. 15, 2001, pp. 182-189.*
(Continued)

*Primary Examiner* — Mang Yeung
(74) *Attorney, Agent, or Firm* — Tutunjian & Bitetto, P.C.

(57) ABSTRACT

A method for restoring a service reservation booking system in a network after a failure, that comprises a first step of invalidating at least a portion of the bookings which cannot be seen anymore by the service booking system due to the failure, a second step of recalculating the bookings which cannot be seen anymore by the service booking system by validating the bookings which are valid in the network topology after the failure and by cancelling the bookings which are invalid in the network topology after the failure.

(Continued)

Advantageously, the method of the present invention further includes a third step during which the nodes of the network disappear from the service booking system. The present invention also includes to a service booking system in a network.

16 Claims, 6 Drawing Sheets

(51) Int. Cl.
*H04L 12/54* (2013.01)
*H04L 12/24* (2006.01)
*H04L 12/723* (2013.01)
*H04L 12/801* (2013.01)
*H04L 12/911* (2013.01)

(52) U.S. Cl.
CPC .......... *H04L 41/0695* (2013.01); *H04L 41/08* (2013.01); *H04L 41/0896* (2013.01); *H04L 41/12* (2013.01); *H04L 45/50* (2013.01); *H04L 47/15* (2013.01); *H04L 47/746* (2013.01); *H04L 47/781* (2013.01)

(58) Field of Classification Search
USPC .............. 370/216–228, 241–253; 714/2–4.4; 340/3.43, 3.44
See application file for complete search history.

(56) References Cited

U.S. PATENT DOCUMENTS

| | | | |
|---|---|---|---|
| 7,644,179 B1* | 1/2010 | Jain et al. | 709/238 |
| 2002/0080829 A1* | 6/2002 | Ofek et al. | 370/539 |
| 2003/0165119 A1 | 9/2003 | Hsu et al. | |
| 2003/0206521 A1 | 11/2003 | Qiao | |
| 2004/0128397 A1 | 7/2004 | Glasmann et al. | |
| 2004/0243702 A1* | 12/2004 | Vainio et al. | 709/224 |
| 2004/0255049 A1 | 12/2004 | Italiano et al. | |
| 2005/0063701 A1 | 3/2005 | Ovadia et al. | |
| 2005/0135330 A1* | 6/2005 | Smith et al. | 370/351 |
| 2005/0169280 A1* | 8/2005 | Hermsmeyer | H04J 3/1617 370/395.51 |

FOREIGN PATENT DOCUMENTS

| | | |
|---|---|---|
| JP | 2002033739 A2 | 1/2002 |
| WO | WO9750211 A1 | 12/1997 |

OTHER PUBLICATIONS

Chi-Hsiang Yeh; "Scalable, adaptive, and reliable resource management in high-speed and mobile networks" Computer Communications and Networks, 2001 Proceedings Tenth International Conference on Oct. 15-17, 2001, IEEE, Oct. 15, 2001, pp. 182-189, XP010562093.

Lu Shen et al: "Centralized vs. distributed connection management schemes under different traffic patterns in wavelength-convertible optical networks" ICC 2002. 2002 IEEE International Conference on Communications, Conference Proceedings, Apr. 28-May 2, 2002, vol. 5, Apr. 28, 2002, pp. 2712-2716, XP010589974, Search Report Dated Jun. 19, 2008.

Das, S. et al. "ZRESTORE:ALINKRESTORATIONSCHEME WITH High Aggregation and no Reservation," Next Generation Optical Network Design and Modelling, IFIP TC6 / WG6.10 Sixth Working Conference on Optical Network Design and Modeling (ONDM 2002), Feb. 2002, Torino, Italy. pp. 1-15.

Norden, S. et al. "Routing Bandwidth Guaranteed Paths with Restoration in Label Switched Networks," Computer Networks, vol. 46, No. 1, Sep. 2004. pp. 71-79.

Sabaei, M. et al. "A Novel VP-Based ATM Restoration Scheme for Providing Multiple Restorability Levels," ATM (ICATM 2001) and High Speed Intelligent Internet Symposium, 2001. Joint 4th IEEE International Conference, Apr. 2001. pp. 333-338.

Yao, Z. et al. "Fast—Unreserved Failure Restoration for Meshed Intelligent Photonic Networks," Photonic Network Communications, vol. 8, Issue 1, Jun. 2004. pp. 105-117.

* cited by examiner

METHOD FOR RESTORING A SERVICE BOOKING SYSTEM IN A NETWORK AFTER FAILURE

This application claims the benefit, under 35 U.S.C. §365 of International Application PCT/FR2007/052314, filed November 8, 2007, which was published in accordance with PCT Article 21(2) on May 15, 2008 in English and which claims the benefit of French patent application No. 0654843, filed Nov. 10, 2006.

SCOPE OF THE INVENTION

The present invention relates to the domain of networks.

The present invention relates more specifically to a method for restoration of a network service reservation system after a failure. The method applies to loop-free networks, that is that at a given instant, there is a unique path between two points of the network and this unique path is only modified by a change in the topology of the network. In the sense of the present invention, a service reservation system is a centralised system that ensures a service on a network path between two points of a loop-free network.

PRIOR ART

Quite often, the systems of the prior art did not take into account the fact that network failures can take place. When a failure takes place the reservation system suffers a "crash" and does not return to a stable condition.

The prior art already knows methods and systems for restoring the link on a network, that is methods and systems that consist in re-establishing the transmission of data between two points on a network.

In a loop-free network, there is a single path between two points on the network. A network failure therefore cuts the transmission of data at the point of failure. The traffic cannot be re-routed in a loop-free network. The traffic can resume if the network if the network re-establishes links to transmit the data. This can be done "manually" by the addition of network equipment, or via protocol, as the STP (Spanning Tree Protocol) protocol does, which searches for redundant links that were previously deactivated, to create the loop-free network. This aspect of re-establishment of data transmission works currently and is not the object of the present invention.

When a centralised system manages a service reservation system, that is controls the access to the service and ensures the requested service, it updates the status of the reservations on the network. When there is a network failure, the topology of the network can be modified: suppression of a network node, service degradation on some links or even disappearance of entire parts of the network. Likewise, it is possible that new elements appear, particularly after a network failure: addition of a network node, appearance of new links or even improvement of the service on a link.

In the case of a network failure, the information concerning service reservations can be no longer coherent, for example for a service reserved on a part of the network that has disappeared. In this case, it is necessary to implement mechanisms internal to service management to again render coherent the information and more generally the service management.

The prior art knows from the American patent application US 2005/0063701, a method and a system to restore resources upon the occurrence of a data burst loss in optical communication networks based on WDM (Wavelength Division Multiplexing) protocol. This American patent application describes a mechanism for the reservation of resources shared at the level of each item of network equipment, thus a distributed architecture for this mechanism. This document of the prior art introduces a means to refuse and/or stop a communication when this latter leads at the level of at least one of the items of core network equipment, to the detection of a failure (network overload, broken link, etc). The architecture implemented in this American patent application is entirely distributed and does not rely on a centralised knowledge of the topology. The control/command of this prior mechanism uses a wavelength attributed only to the exchange of system data.

The present invention intends to overcome the disadvantages of the prior art by proposing a method that enables the return to operation of a services manager in a loop-free network, which implicates manager internal operations.

SUMMARY OF THE INVENTION

The present invention relates to a centralised mechanism for the recovery of established resource reservations with respect to a centralised management of the topology. When the topology manager detects a change, it informs the resources manager that detects possible conflicts/failures introduced by this new topology on the reservations of resources previously established and attempts to automatically resolve them by contacting the nodes concerned or by alerting the system user. It is to be noted that the control/command of this mechanism uses a packet mode protocol using a unique identifier (address, port number) attributed at the exchange of these packets.

The present invention is based on a centralised knowledge of the topology, while the architecture implemented in the American patent application US 2005/0063701 is entirely distributed.

For this purpose, the present invent relates in its most generally accepted sense, to a method for restoration of a service reservation system on a network after a failure comprising a first step consisting of invalidating at least some of the reservations that are no longer visible to said service reservation system due to said failure, a second step consisting in recalculating said reservations that are no longer visible to said service reservation system while validating the reservations that are valid in the network topology after said failure and cancelling reservations that are invalid in the network topology after said failure.

Advantageously, said method also comprises a step during which the network nodes disappear from the service reservation system.

According to a specific embodiment, the disappearance of nodes at the level of the service reservation system takes place at the expiration of a predetermined delay.

Preferably, an external action deactivates the elements implicated in the inactive reservations.

According to a variant, said external action is manual.

According to another variant, said external action comes from an external module.

The present invention also relates to a network service reservation system characterized in that it comprises:
  means for invalidating at least some of the reservations that are no longer visible to said service reservation system due to a failure,
  means for recalculating said reservations that were no longer visible to the service reservation system,
  means for validating the reservations that are valid in the network topology after said failure, and means for cancelling the reservations that are invalid in the network topology after said failure.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

The method according to the present invention applies to loop-free networks, that is that at a given instant, there is a unique path between two points of the network and this unique path is only modified by a change in the topology of the network. By network failure is understood, in the sense of the present invention, a modification in the network topology that renders completely unusable or progressively degraded one or several network link(s). In the sense of the present invention, a service reservation system is a centralised system that ensures a service on a network path between two points of a loop-free network.

In the present invention, the service manager is based on an entity that enables it to have a current view of the network topology that it manages.

The method according to the present invention is advantageously implemented in a system comprising:
  a loop-free network, and
  a centralised service manager situated on a network node.

Service reservations take place on a path between two network nodes. The communications traffic between the service manager and the items of network equipment that send service reservation requests have the highest priority.

There are several types of service reservation messages, among which are found:
  The new service reservation, and
  the release of a service reservation.

The service manager maintains a list of granted service reservations. This list can take the following form:

TABLE 1

| Identity | Service applicant | User 1 of the service | User 2 of the service | Quantity |
|---|---|---|---|---|
| Reservation identifier | Network node | Network node | Network node | Quantification of the requested service |

The service applicant can be other than the two network nodes that use the service.

Certain events can render the service reservation system unstable.

When a service user wants to quit the network, he must release all his service reservations before quitting the network.

Figure 1:
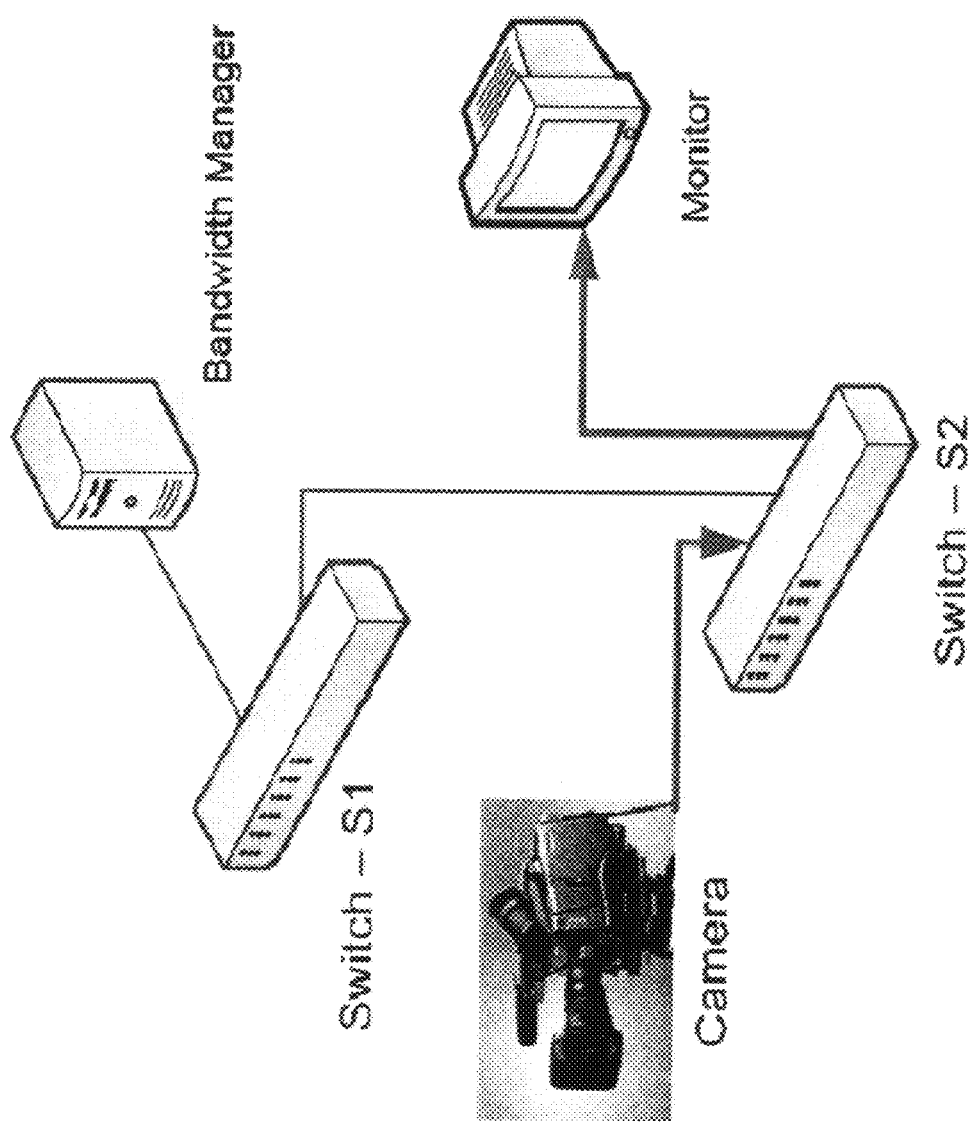
FIG. 1 shows the case where a stream is reserved.

On FIG. 1 can be seen a camera (service user) that requests a reservation of bandwidth to the monitor from the bandwidth manager. This reservation has been granted and the network operates correctly. The data exchanges transit via the switch S2.

Figure 2:
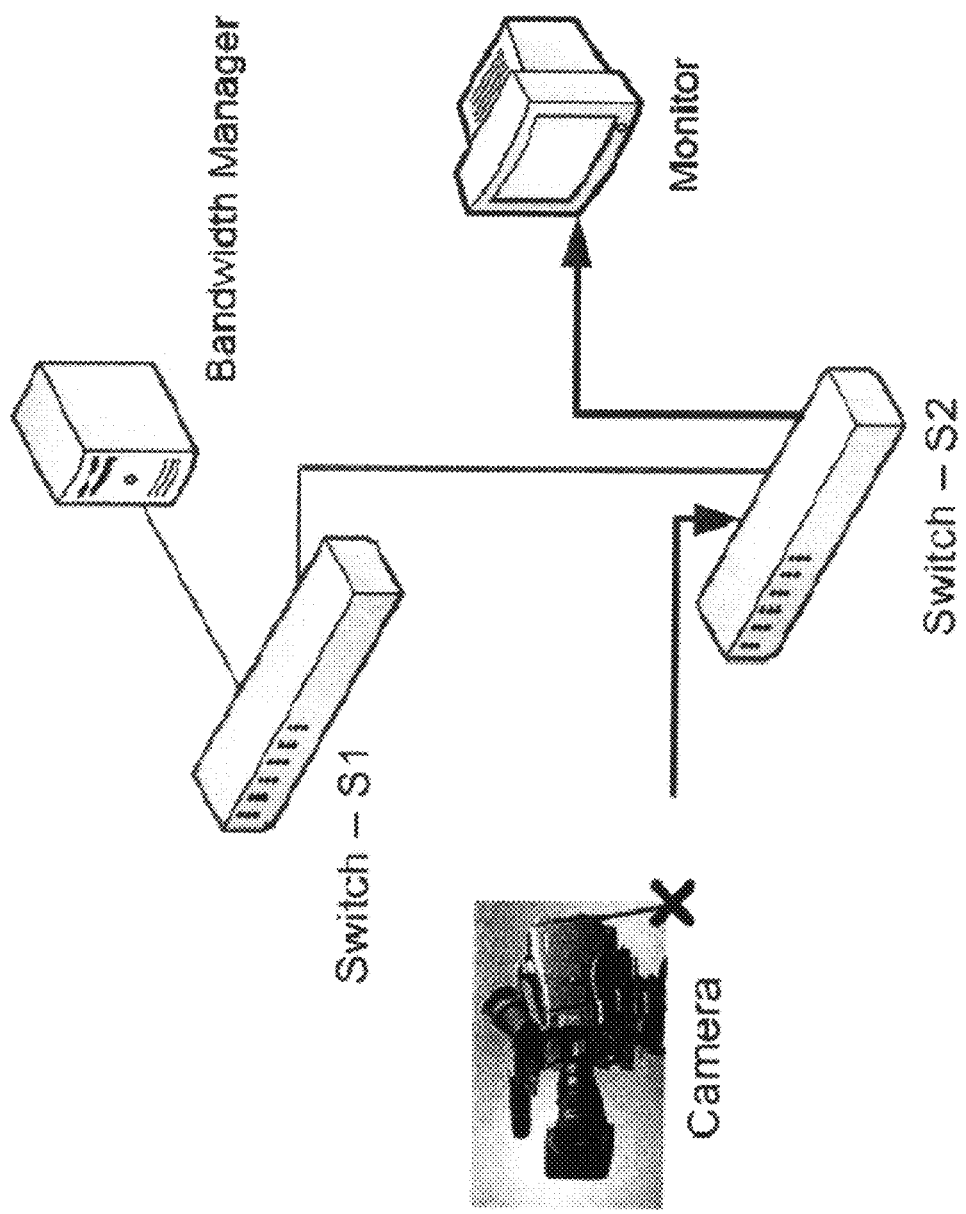
FIG. 2 shows the case where a service user quits the network.

On FIG. 2, the camera quits the network without releasing the service reservation. Here, the reservation is still taken into account by the bandwidth manager but does not exist in reality.

The service manager sees on its topology that the service user is no longer there and can envisage two scenarios:
  Either the service user has ended its activity and no longer wants to use the service. The service manager must in this case release the reservation.
  Or the service user has encountered a problem and cannot pursue its activity for the moment, but hope to pursue its activity later. The service manager can in this case not release the reservation.

It can be decided to release the service reservation for both scenarios: to reuse the service the service user must perform a new service reservation request. This case presents a problem if the service user quits the network and returns, thinking that his service reservation is still active. In this situation, the user (of the service) uses a service that is not reserved.

In the preceding example, the camera of FIG. 2 could have not detected that the link is no longer working, and could therefore, once the link is re-established, still transmit traffic thinking that the bandwidth is reserved.

In what follows, it is considered that the service users are not aware of possible failures in the network. This explains the decision to consider that when a service user wants to quit the network, he must release all his service reservations before quitting the network.

In the following example, a network failure is repaired by modifying the network topology. This modification provokes conflicts between reservations.

In this example, the service is the bandwidth.

Other examples of services managed by the service manager could be:
  Telephone service: the service is the opening of telephone connections. The quantification of the service will be the number of connections authorised on a link. The degradation of a service could be the reduction in the number of connections authorised.
  On-demand video services: the service is to provide a video from a server to a viewer. The quantification of the service could be the video quality. The degradation of the service could then be that a server continues to provide a video but of lower quality.
  Guarantee time of a road path: the service is to provide the path time that allows going from one point to another. The quantification of the service could be the congestion state of the road network. The degradation of the service would then be if traffic jams occur.
  Package transport service: the service is to ensure that a package is transported from one town to another. The quantification of the service will be the number of packages that can be transported between 2 towns. The degradation of the service will be the reduction in the maximum number of packages transported between 2 towns.

In our example, the links are Ethernet 100 Mbits/s with the exception of the link between switches 3 and 4 which are at 1 GBits/s.

The present invent is not limited to bandwidth: it also applies to other types of service between two points of a loop-free network, for example those presented above.

Figure 3:
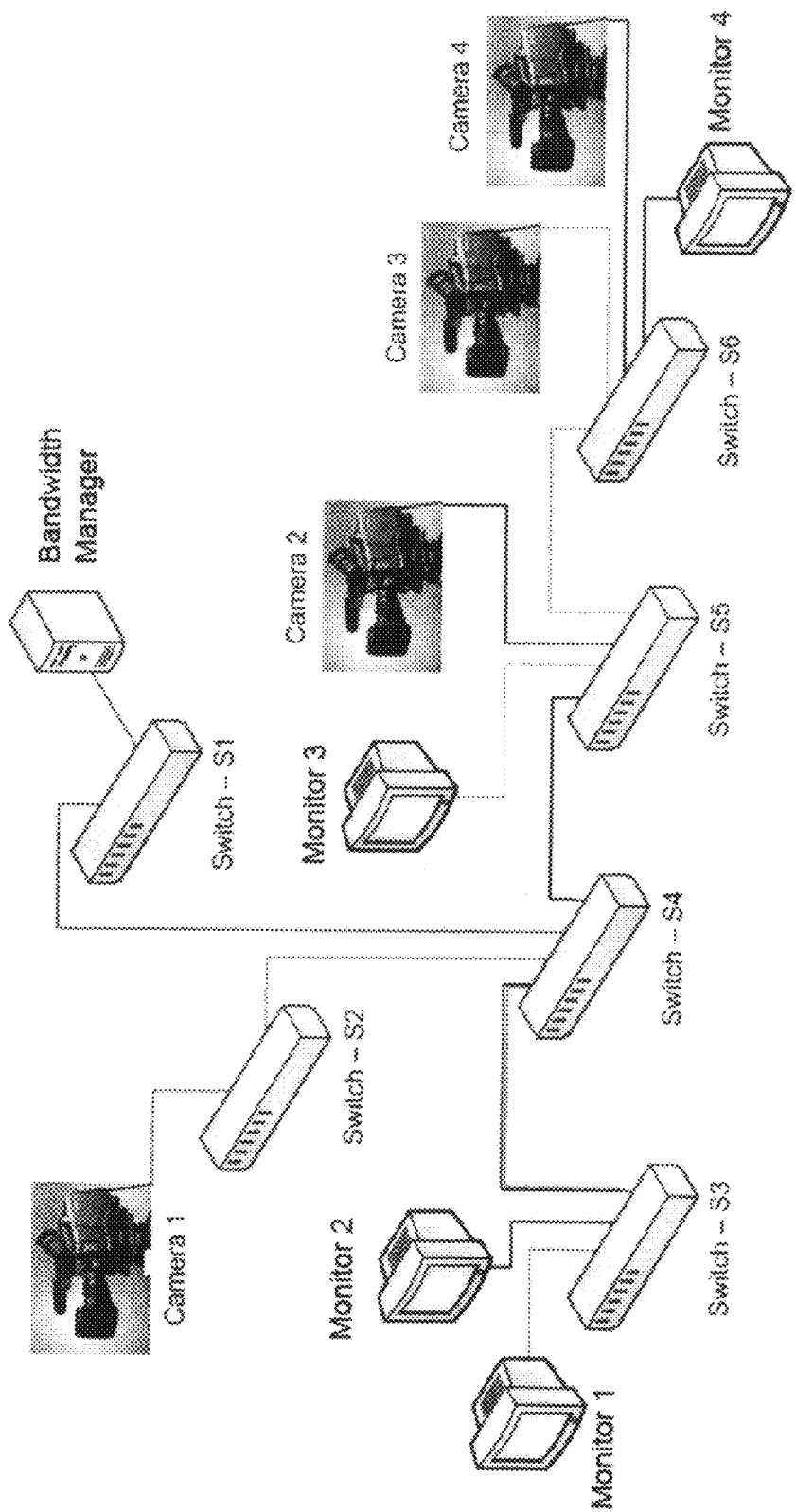
FIG. 3 shows an example of a network with different streams reserved.

In the network of this example, shown in FIG. 3, the reserved streams were granted by the bandwidth manager: from camera 4 to monitor 4, from camera 3 to monitor 3, from camera 2 to monitor 2 and from camera 1 to monitor 1.

The table of the (bandwidth) service manager is:

TABLE 2

| Identity | Validity | Service applicant | Source | Destination | Quantity |
|---|---|---|---|---|---|
| 1 | Valid | Camera 1 | Camera 1 | Monitor 1 | 80 Mbits/s |
| 2 | Valid | Camera 2 | Camera 2 | Monitor 2 | 80 Mbits/s |
| 3 | Valid | Camera 3 | Camera 3 | Monitor 3 | 80 Mbits/s |
| 4 | Valid | Camera 4 | Camera 4 | Monitor 4 | 80 Mbits/s |

Figure 6:
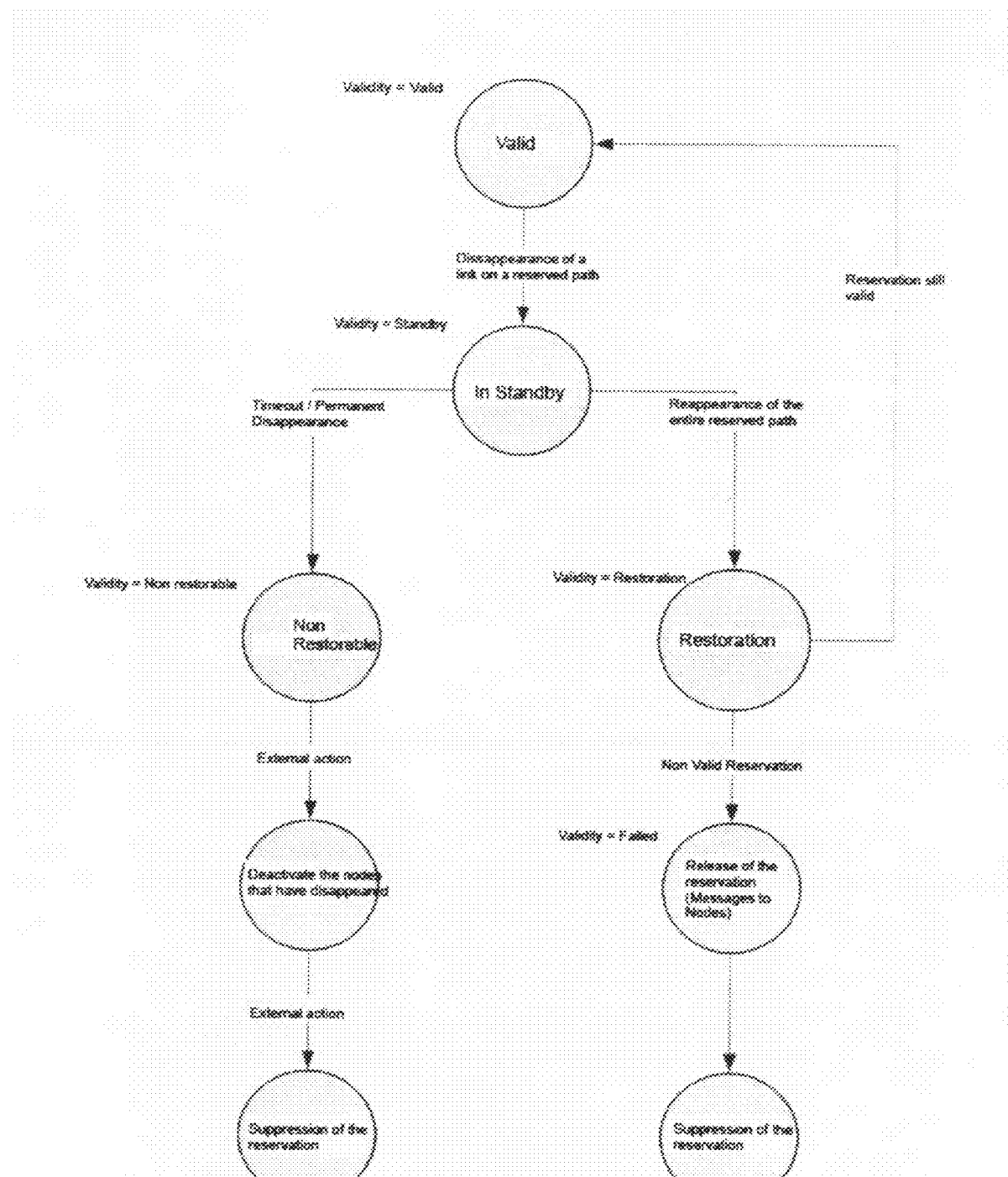
FIG. 6 shows the various steps of the method according to the present invention.

The different steps of the method according to the present invention are shown in FIG. 6. This FIG. 6 shows the restoration of a reservation during a complete failure of a link or of an item of equipment.

The method for a progressive degradation of a link or an item of equipment is presented hereafter.

A—Complete failure.

The state diagram presented in this figure describes the operation of a reservation. The various reservations of the preceding example (Table 2) are found in the initial state: Valid.

Figure 4:
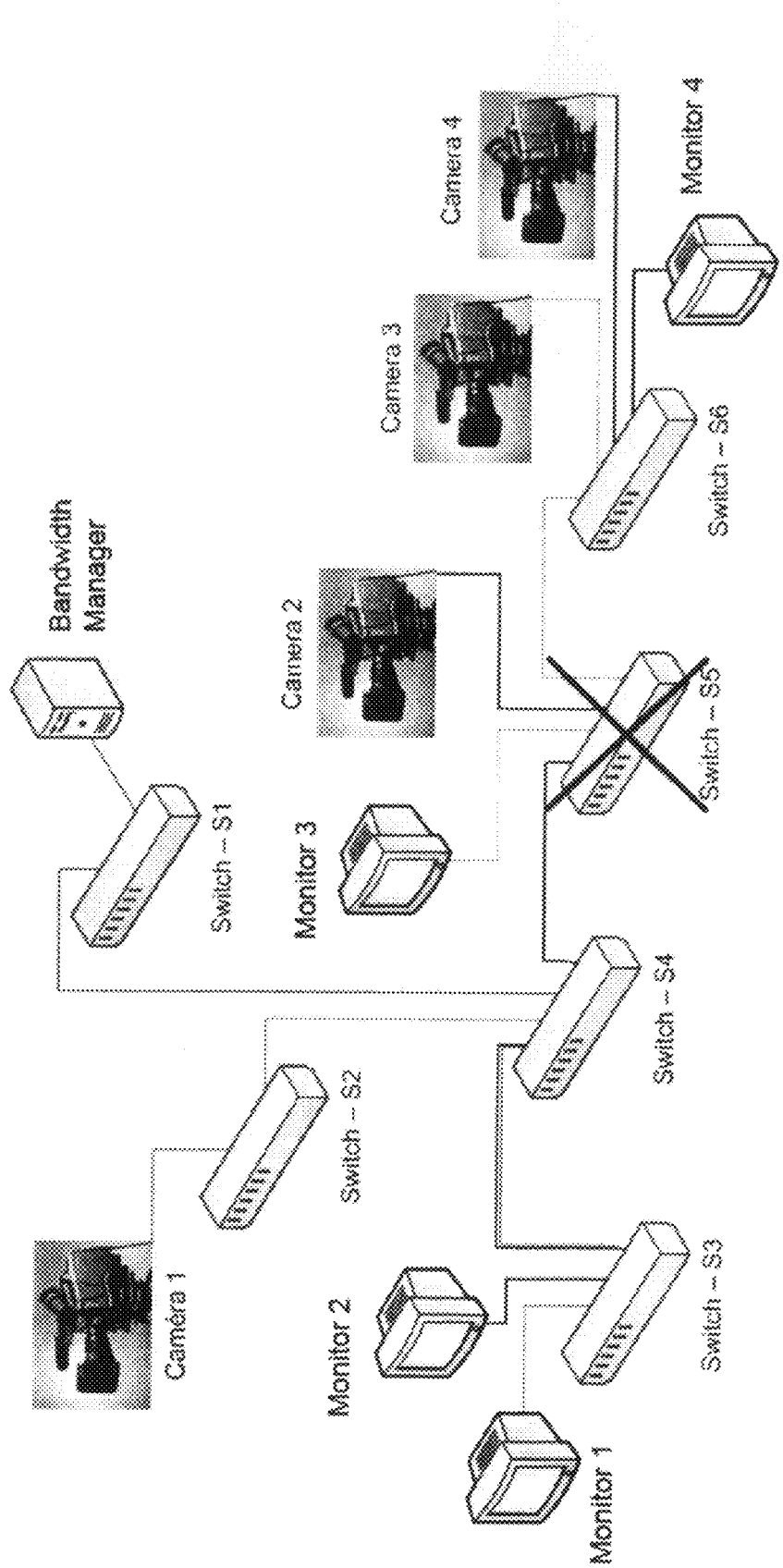
FIG. 4 shows the network of FIG. 3 in which a switch experiences a failure.

Next, the switch 5 experiences a failure. The service/bandwidth manager only sees the left side of the network: switch 1, switch 2, switch 3, switch 4, monitor 1, monitor 2 and camera 1. The failure of switch 5 is shown in FIG. 4.

The service/bandwidth manager could have chosen to delete from its table all reservations that had partially disappeared from the network topology, that is to only conserve reservation 1. However this decision would pose certain problems. In fact reservation 4 still works and so, when the network is repaired, this reservation should not be removed as it has always worked. Hence, in order to indicate that a reservation is perhaps invalid but that this is not affirmed, the value "Valid" must be changed to "In standby". The state machine (FIG. 6) of reservations 2, 3 and 4 passes to the "In standby" state. The links of reservation 1 have not disappeared, its state therefore remains as "Valid".

Hence, no reservation entry should be deleted from the services manager table.

The table of the service manager is now:

TABLE 3

| Identity | Validity | Service applicant | Source | Destination | Quantity |
|---|---|---|---|---|---|
| 1 | Valid | Camera 1 | Camera 1 | Monitor 1 | 80 Mbits/s |
| 2 | In standby | Camera 2 | Camera 2 | Monitor 2 | 80 Mbits/s |
| 3 | In standby | Camera 3 | Camera 3 | Monitor 3 | 80 Mbits/s |
| 4 | In standby | Camera 4 | Camera 4 | Monitor 4 | 80 Mbits/s |

All of the streams arriving at switch 5 were routed to switch 2. All the reservation sources/destinations currently in the state "In standby" reappear on the network. As the state machine indicates in FIG. 6, the reservations 2, 3 and 4 pass therefore into the state "Restoration". This state passes the value "Validity" to "Restoration".

Figure 5:
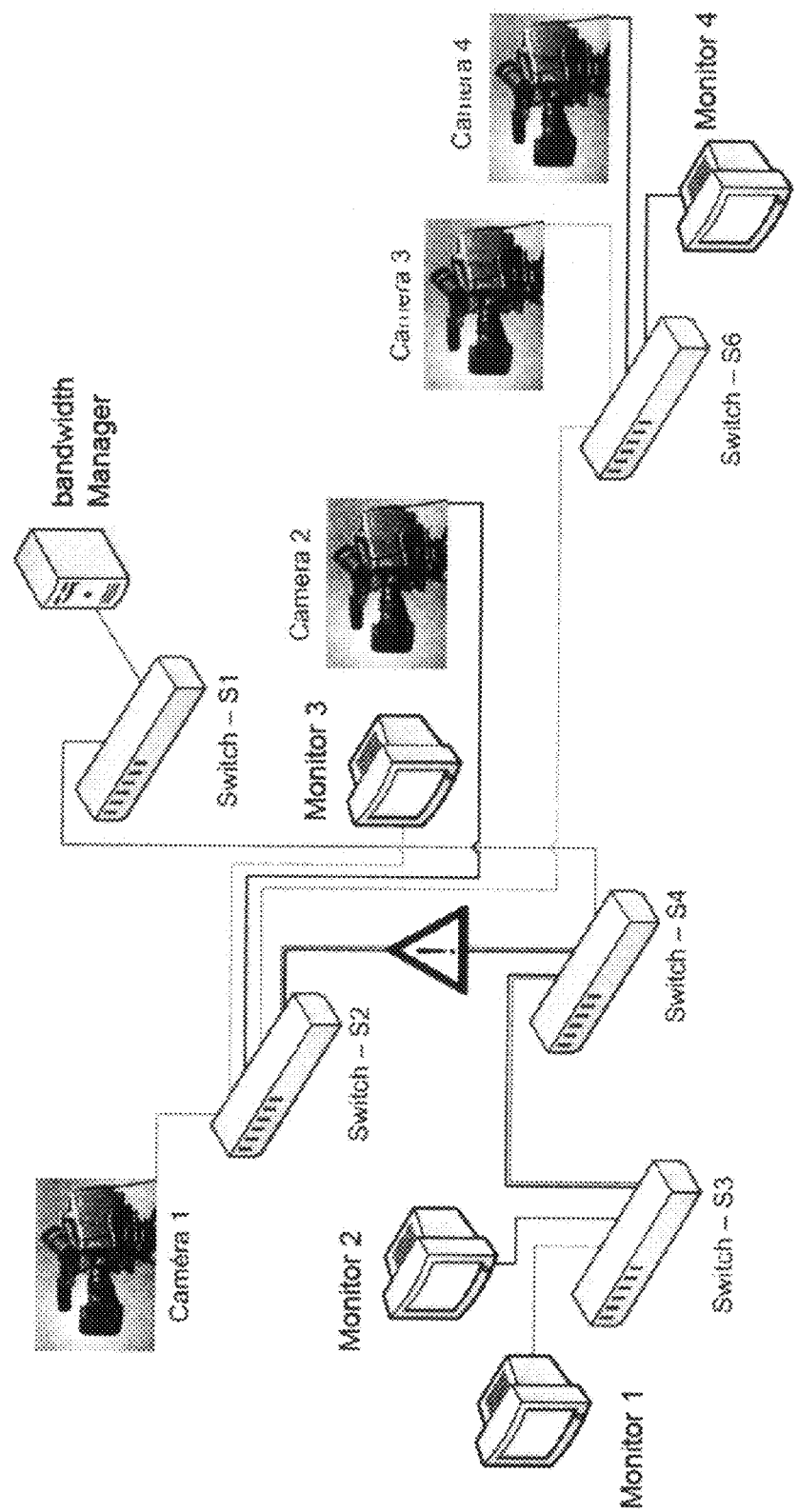
FIG. 5 shows the network of the preceding Figure in which is observed a reshaping of the topology.

The reshaping of the network topology is illustrated in FIG. 5.

Once the services manager again finds the network equipment that are implicated in a service reservation, it must restore all the "restorable" reservations that is those for which the two network nodes and a path exist in the topology of the current network. Naturally, if the two network nodes or a path do not exist, it is not possible to realise the operation on the reservation.

A "non-restorable" reservation detected following the disappearance of two network nodes and paths is considered as being definitive. This definitive character can be determined using a reappearance delay. Before the detection of the definitive character of the disappearance, a "non-restorable" reservation remains in the "In standby" state.

The methods applied for a "non-restorable" reservations are described hereafter.

The first step in the restoration is the processing of all the "restorable" reservations. The service manager must validate the reservations that are valid and must detect the impossible reservations.

Hence, the switch 6 can be seen by the services manager and reservation 4 can be re-validated due to the fact that the path is the same as before the failure. The bandwidth is still available after the topology reshaping. The state machine of reservation 4 returns therefore to the "Valid" state. The "Validity" value is returned to "Valid".

As for reservation 3, a path still exists between the source and the destination. The difference is that the stream passes via switch 2 instead of passing via switch 5. As for reservation 4, reservation 3 can therefore be re-validated. Its state machine returns to the "Valid" state and the "Validity" value is returned to "Valid".

The table of the services manager is now:

TABLE 4

| Identity | Validity | Service applicant | Source | Destination | Quantity |
|---|---|---|---|---|---|
| 1 | Valid | Camera 1 | Camera 1 | Monitor 1 | 80 Mbits/s |
| 2 | Restoration | Camera 2 | Camera 2 | Monitor 2 | 80 Mbits/s |
| 3 | Valid | Camera 3 | Camera 3 | Monitor 3 | 80 Mbits/s |
| 4 | Valid | Camera 4 | Camera 4 | Monitor 4 | 80 Mbits/s |

Reservation 2 poses some problems, it is an "impossible" reservation. Even if the services manager sent a request for release to camera 2, this latter would not have received it before connecting to the network. Thus, the camera has enough time to send the stream via the new network topology, before receiving the request for release from the manager. In this case the link at 100 Mbits/s between switch 2 and switch 4 cannot support two 80 Mbits/s streams. Here, two streams (reservations 1 and 2) will not be correctly transported. The service is no longer assured for reservation 1 that was not affected by the failure of switch 5 before the reshaping of the topology.

An impossible reservation is a "restorable" reservation that it is impossible to ensure in the new network topology. These reservations must be noted in the "Failed" state.

In the example the services manager table is now:

TABLE 5

| Identity | Validity | Service applicant | Source | Destination | Quantity |
|---|---|---|---|---|---|
| 1 | Valid | Camera 1 | Camera 1 | Monitor 1 | 80 Mbits/s |
| 2 | Failed | Camera 2 | Camera 2 | Monitor 2 | 80 Mbits/s |
| 3 | Valid | Camera 3 | Camera 3 | Monitor 3 | 80 Mbits/s |
| 4 | Valid | Camera 4 | Camera 4 | Monitor 4 | 80 Mbits/s |

The next step consists in requesting the release of reservations noted in the "Failed" state so as to establish a coherent operation of the services reservation system.

In our example, the services manager must request a release for reservation 2 as the link cannot support this reservation on the link between the switches 2 and 4, due to the existence of reservation 1. Once the release of reservation 2 is carried out, the reservation manager deletes the reservation from its table. The service reservation system is again coherent and the table no longer contains reservations in the "In standby" state or in the "Failed" state: the service reservation is once again assured.

In the example the services manager table is now:

TABLE 6

| Identity | Validity | Service applicant | Source | Destination | Quantity |
|---|---|---|---|---|---|
| 1 | Valid | Camera 1 | Camera 1 | Monitor 1 | 80 Mbits/s |
| 3 | Valid | Camera 3 | Camera 3 | Monitor 3 | 80 Mbits/s |
| 4 | Valid | Camera 4 | Camera 4 | Monitor 4 | 80 Mbits/s |

The second step of the restoration of the service reservation system is the activation of "non-restorable" reservations. This is the situation in which some nodes of a service reservation do not return in the network topology.

Once this disappearance is considered as definitive, the machine state of the reservation passes to the state "Non-restorable". This case cannot be treated automatically by the service manager.

The different steps of the method according to the present invention are shown in FIG. 6.

An external decision must release these reservations. It is understood by external decision, in the sense of the present invention, a decision coming from an individual person or a module that possesses more knowledge and a more important degree of command on the service type, in such a way to be able to manage the following steps, which are:
 1. Ensure that the two service users have released the use of their service reservation before connecting them again on the network.
 2. Delete the reservation at service manager level.

The "external decision" must ensure the coherence of information on the different devices involved in the reservations to be released.

B—Progressive Degradation

Using the method according to the present invention, it is possible to restore the reservation system following a network failure. These failures, in the sense of the present invention, can be complete failures of a link or of an item of equipment, but also the degradation of a link or item of equipment.

This progressive approach of the degradation enables management of cases in which the network progressively loses the means to ensure a service, reaching a point where the service reservations granted are no longer guaranteed.

The service manager ensures the service reservations basing itself on the state of the network at the time of the service reservation. As the state of the network changes with time some parameters required for service reservation can become degraded. There is a problem from the point when the degradation of these parameters acquires an importance such that the service can no longer be ensured on the network link in question.

A network degradation must be treated in a different way to a complete network failure, for the following two reasons:
 The degradation is progressive and can be identified before the reservation is in failed state. This can enable an external decision to be obtained in order to overcome the degradation.
 In this case the network failure can be overcome. This is a "can be activated" case as there is still a network connection between the service manager and the applicant for the service reservation.
 If the required parameters are parameters linked to the network topology, the service manager can detect a disturbing degradation and notify the two nodes of the service reservation linked to this degradation.

If network degradation becomes so important that a reservation is in the failed state, the service reservation system restores this "can be activated" reservation. As long as the network link is not in complete failure, the management traffic is transported on this link as it has the highest priority. The communications between the service manager and the applicant are the following:
 The service manager sends a request to release the failed service reservation. The applicant cannot refuse this request.
 The applicant releases the service reservation ceasing to use the service reservation and then sending a release message indicating that the reservation has been released.
 The service manager can update its internal table.
 The service reservation system has been restored following the failure of the service reservation due to degradation.

The invention is described in the preceding text as an example. It is understood that those skilled in the art are capable of producing variants of the invention without leaving the scope of the patent.

The invention claimed is:

1. A method for restoration of a centralized service reservation system on a loop-free network after detection of a failure of said loop-free network, comprising
 invalidating at least some reservations that are no longer visible to a hardware network node having said service reservation system due to said failure, said failure being detected by said centralized system; and
 recalculating, by said hardware network node, said reservations that are no longer visible to said service reservation system while validating reservations that are valid in a network topology after said failure and cancelling reservations that are invalid in the network topology after said failure, said invalid reservations including reservations for which at least one network node does not return into said network topology after said failure, reservations for which at least one network path does not return into said network topology after said failure, and reservations for which network nodes and paths exist in said network topology after said failure but said reservations are impossible to ensure in said network topology,
wherein said network is a loop-free network in which there is a unique path between every pair of points of said network.

2. A method for restoration of a network service reservation system according to claim 1, further comprising detecting a disappearance of at least one network node which is no longer visible to said service reservation system.

3. A method for restoration of a network service reservation system according to claim 2, wherein the detection of said disappearance is determined using a predetermined delay.

4. A method for restoration of a network service reservation system according to claim 1, wherein an external action deactivates nodes of said loop-free network implicated in the reservations that are invalid in the network topology after said failure.

5. A method for restoration of a network service reservation system according to claim 4 wherein said external action is realized manually by a physical person.

6. A method for restoration of a network service reservation system according to claim 4 wherein said external action is realized by an external module.

7. A method for restoration of a network service reservation system according to claim 1, wherein the failure is a degradation of a network link's performance.

8. A method for restoration of a network service reservation system according to claim 7, wherein said method for restoration comprises:
identifying said degradation when said degradation is present but said network link is not in complete failure; and
restoring one of said reservations corresponding to said network link only when said reservation is in a failed state.

9. A centralized network service reservation system comprising:
means for invalidating at least some reservations that are no longer visible to said service reservation system due to a failure;
means for recalculating said reservations that were no longer visible to the service reservation system after said failure;
means for validating the reservations that are valid in a network topology after said failure; and
means for cancelling the reservations that are invalid in the network topology after said failure, wherein said network is a loop-free network in which there is a unique path between every pair of points of said network, said invalid reservations including reservations for which at least one network node does not return into said network topology after said failure, reservations for which at least one network path does not return into said network topology after said failure, and reservations for which network nodes and paths exist in said network topology after said failure but said reservations are impossible to ensure in said network topology.

10. A centralized network service reservation system, comprising:
a centralized service manager on a hardware network node configured to invalidate at least some reservations that are no longer visible to the centralized service manager due to a failure, to recalculate said reservations that were no longer visible to the centralized service manager after said failure, to validate any reservations that are valid in a network topology after said failure, and to cancel the reservations that are invalid in the network topology after said failure, said invalid reservations including reservations for which at least one network node does not return into said network topology after said failure, reservations for which at least one network path does not return into said network topology after said failure, and reservations for which network nodes and paths exist in said network topology after said failure but said reservations are impossible to ensure in said network topology,
wherein said network topology is a loop-free network in which there is a unique path between every pair of points on said network.

11. The centralized network service reservation system according to claim 10, wherein the centralized service manager is further configured to detect a disappearance of at least one network node which is no longer visible to said service reservation system.

12. The centralized network service reservation system according to claim 11, wherein the detection of said disappearance is determined using a predetermined delay.

13. The centralized network service reservation system according to claim 10, wherein an external action deactivates nodes of said loop-free network implicated in the reservations that are invalid in the network topology after said failure.

14. The centralized network service reservation system according to claim 10, wherein the failure is a degradation of a network link's performance.

15. A method for restoration of a centralized service reservation system on a loop-free communication network after detection of a failure of said loop-free network, comprising:
invalidating at least some reservations that are no longer visible to a network node having said service reservation system due to said failure, said failure being detected by said centralized system;
recalculating, by said network node, said reservations that are no longer visible to said service reservation system while validating reservations that are valid in a network topology after said failure and cancelling reservations that are invalid in the network topology after said failure, said invalid reservation including reservations for which at least one network node does not return into said network topology after said failure, reservations for which at least one network path does not return into said network topology after said failure, and reservations for which network nodes and paths exist in said network topology after said failure but said reservations are impossible to ensure in said network topology; and
restoring, by said network node, said validated reservations in said loop-free communication network,
wherein said network is a loop-free communication network in which there is a unique path between every pair of points of said network.

16. A centralized network service reservation system on a loop-free communication network, comprising:
a centralized service manager on a network node configured to invalidate at least some reservations that are no longer visible to the centralized service manager due to a failure, to recalculate said reservations that were no longer visible to the centralized service manager after said failure, to validate any reservations that are valid in a network topology after said failure, to cancel the reservations that are invalid in the network topology after said failure and to restore said validated reservations in said loop-free communication network, said invalid reservations including reservations for which at least one network node does not return into said network topology after said failure, reservations for which at least one network path does not return into said network topology after said failure, and reservations for which network nodes and paths exist in said network topology after said failure but said reservations are impossible to ensure in said network topology, wherein said network topology is a loop-free communication network in which there is a unique path between every pair of points on said network.

\* \* \* \* \*